(12) United States Patent  
Patil

(10) Patent No.: US 11,745,089 B2  
(45) Date of Patent: Sep. 5, 2023

(54) APPARATUS FOR A BOARD GAME

(71) Applicant: Pratima Patil, Navi Mumbai (IN)

(72) Inventor: Pratima Patil, Navi Mumbai (IN)

( * ) Notice: Subject to any disclaimer, the term of this patent is extended or adjusted under 35 U.S.C. 154(b) by 30 days.

(21) Appl. No.: 17/482,673

(22) Filed: Sep. 23, 2021

(65) Prior Publication Data

US 2022/0258037 A1 Aug. 18, 2022

(51) Int. Cl.
*A63F 13/822* (2014.01)
*A63F 3/04* (2006.01)
*A63F 11/00* (2006.01)
*A63F 3/00* (2006.01)

(52) U.S. Cl.
CPC ........ *A63F 3/0415* (2013.01); *A63F 3/00697* (2013.01); *A63F 11/0074* (2013.01); *A63F 13/822* (2014.09); *A63F 2003/00996* (2013.01); *A63F 2003/0418* (2013.01)

(58) Field of Classification Search
CPC .. A63F 3/0415; A63F 3/00697; A63F 13/822; A63F 2300/00996; A63F 2300/0418; A63F 11/0074
See application file for complete search history.

(56) References Cited

U.S. PATENT DOCUMENTS

| | | |
|---|---|---|
| 2,930,621 A | 3/1960 | Gross et al. |
| 3,741,546 A | 6/1973 | Chen |
| 4,046,381 A | 9/1977 | Comeaux |
| 4,082,284 A | 4/1978 | Jennings |
| 4,432,553 A | 2/1984 | Moore |
| 4,449,710 A | 5/1984 | Davis |
| 5,085,441 A | 2/1992 | Jova |
| 5,913,519 A | 6/1999 | Sindelar |
| 6,019,370 A | 2/2000 | Morris |
| 6,089,871 A * | 7/2000 | Jaffe ...................... G09B 19/02 273/271 |
| 6,983,937 B2 | 1/2006 | Levinson |
| 7,168,704 B1 * | 1/2007 | Lawless .................... A63F 3/02 273/237 |

(Continued)

FOREIGN PATENT DOCUMENTS

| | | | |
|---|---|---|---|
| DE | 2738798 A1 | 3/1979 | |
| GB | 645661 A | 11/1950 | |
| GB | 2284561 A * | 6/1995 | ......... A63F 3/00697 |

OTHER PUBLICATIONS

File History of U.S. Appl. No. 16/309,517, filed Dec. 13, 2018 (copy not provided).

*Primary Examiner* — David L Lewis
*Assistant Examiner* — S. N. H.
(74) *Attorney, Agent, or Firm* — Thomas Horstemeyer, LLP

(57) ABSTRACT

A board game apparatus is described that includes a square playing board, and a first set and a second set of game coins. The square playing board includes a playing surface and two opposite playing sides, namely, attacking side (A) and defending side (D). The first set of game coins (f) are marked with indicia, such as I, II, III, IV, V, VII, and XI. The second set of game coins (s) consist of indicia Hash (#). The attacking side (A) is allotted with the first set of game coins (f) and the defending side (D) is allotted with the second set of game coins (s). The board game apparatus is designed to play games employing mathematical skills which provide amusement and educational stimulation to both adults and children.

1 Claim, 13 Drawing Sheets

(56) References Cited

U.S. PATENT DOCUMENTS

| | | | |
|---|---|---|---|
| 2006/0080070 A1* | 4/2006 | Flansburg | G09B 19/025 |
| | | | 703/2 |
| 2010/0196860 A1 | 8/2010 | Donzow | |
| 2012/0175842 A1* | 7/2012 | Collins | A63F 3/02 |
| | | | 273/260 |
| 2012/0306154 A1* | 12/2012 | Donald | A63F 3/02 |
| | | | 273/261 |
| 2018/0154248 A1* | 6/2018 | Duprey | A63F 11/0074 |
| 2020/0306617 A1 | 10/2020 | Patel | |

\* cited by examiner

Set (f) - Game pieces marked with
indicia I, II, III, IV, V, VII, IX
Set (s) - Game piece marked with
indicia #

---- Jumps to a non adjacent square by passing any intervening game coin.

—— Move any number unobstructed / unoccupied squares.

• indicates possible landing positions

---- Jumps to a non adjacent square by passing any intervening game coin.

___ Move any number unobstructed / unoccupied squares.

● indicates possible landing positions

---- Jumps to a non adjacent square by passing any intervening game coin.

—— Move any number unobstructed / unoccupied squares.

● indicates possible landing positions

Either move one # coin (at 23) 3 places (to 26)

OR move three # coins (at 47, 61 & 83) 1 place each (to 48, 62 & 84 respectively)

21 —— 84
14 —— 98
7 —— 70

APPARATUS FOR A BOARD GAME

CROSS-REFERENCE TO RELATED APPLICATION

This application claims the benefit of and priority to India Patent Application No. 202121006028 filed Feb. 12, 2021, the contents of which being incorporated by reference in their entirety herein.

BACKGROUND

Nowadays, strategy board games are becoming popular. The strategy board games involve excitement and challenge of the play and winning the game. In addition, the strategy board games attract people of all age groups and create a socially interactive environment. The strategy board games have game rules, according to which players move their game pieces over a game board. However, the conventional strategy board games fail to act as a means of education. The strategy board game of present invention can efficiently act as a means of education. In addition, the present invention involves use of mathematics which facilitates learning to students and creates an intellectual environment for the players. Further, the present board game is easy to build and has low-cost production.

Further, conventional strategy board games have existed for so long that due to limited number of possible moves, the developing of new strategies has plateaued. One possible innovation ensures that strategies used in a game must not become repetitive is to introduce an element of randomness, usually through the use of one or more dices.

In U.S. Pat. No. 6,983,937 B2 to Levison, a dynamic non-static game board is formed at the beginning of each game by the players each placing tiles having playing spaces which may have side walls. The walls create a maze configuration through which pieces move. To win, one must move all of one's pieces, 1-5 depending on difficulty level, from one side of the board and off the opposite side. A random number selection means such as dice indicates the number of spaces to be moved. On some turns at least one visual indicator for a "stack" move and another for side a "slide" move appear simultaneously with a number. A stack allows a player to stack a tile on top of an existing tile to alter the configuration of the maze. A slide allows a player to slide another tile into one end of one row, thus pushing an existing tile off the other end of the row and possibly altering the maze configuration. The strategy game may be programmed and displayed on a visual media such as a video game or on the World Wide Web.

However, adding an element of randomness to a game of strategy can sometimes cause a lesser skilled player to win over a more skilled person, removing the incentive for lesser skilled player to get better at developing strategies.

U.S. Patent Publication No. 2020/0306617 A1 to Patil discloses a board game apparatus comprising a rectangular playing board having at least one playing surface and two opposite playing sides. The playing surface is made of a rectangular array of alternating 7 to 10 vertical columns and odd number of horizontal rows of abutting units, wherein every square of the rectangular array on the playing surface is allotted a numerical value. It is provided with two equal sets of game pieces wherein the game pieces are marked with an indicia such 2, 3, 4, 5, 7, 11, and Star (*) and one game piece indicating an indicia 1. However, the playing surface of the board described does not allow easier identification of legal and illegal moves of different move sets.

Further, the movements of game pieces defined, is limited, hence effecting number of strategies that may be developed for winning the game. There continues to be a need for a new and improved board game which addresses both the problems of staying interesting, allowing a larger number of winning strategies, easily recognizable representation of legal and illegal moves and being educational.

TECHNICAL FIELD

The present invention relates to a board game and more particularly to games employing mathematical skills. It may also be used for learning the various math functions in an effective and entertaining process.

BRIEF SUMMARY OF THE INVENTION

In an aspect, the present invention relates to a board game including a square playing board, a first set of game coins, and the second set of game coins. The square playing board comprising a playing surface and two opposite playing sides (A, D). In addition, the two opposite playing sides comprising an attacking side (A) and a defending side (D), a first player, known as attacker, plays from the attacking side and a second player, known as defender, plays from the defending side, characterized in that the playing surface is marked with 100 abutting small squares arranged in 10 rows and 10 columns, the 10 rows extending from the attacking side to the defending side.

In addition, each abutting small square is marked with a number from 1 to 100 such that numbering arrangement of the abutting units in the first row on playing surface begins from 1, and sequentially goes till 10 and further continued in likewise manner for further rows by numbering the abutting units of next immediately adjacent rows with 10 digits higher numbers than the number mentioned on its adjacent abutting unit of previously numbered row. The numbering arrangement of the abutting units in the last row on the playing surface begin with 91 to go sequentially and end with 100. The first set of game coins (f), containing 1 game coin marked with indicia I, 2 game coins marked with indicia II, 2 game coins marked with indicia III, 2 game coins marked with indicia IV, 2 game coins marked with indicia V, 1 game coins marked with indicia VII and 1 game coin marked with indicia XI. In addition, the second set of game coins consists of 20 game coins marked with indicia Hash (#).

The attacker is allotted the first set of game coins (f) and the defender is allotted the second set of game coins (s). Each turn, the attacker attacks defender by moving any 1 game coin from first set of game coins (f), and the defender defends attacker by moving either three game coins from second set of game coins into 1 abutting small square each or one game coin from second set of game coins 3 abutting small squares. In addition, the position of the players is interchanged in other half of the board game. The player eliminating the indicia Hash (#) in less time or in a smaller number of moves is declared winner of the board game. Each of the 100 abutting small squares are marked with a pattern that is indicative of the which of the coins from the first set of game coins may occupy that abutting small square.

In an embodiment of the present disclosure, at the start of game, the second set of coins are placed on two-digit prime number on the playing surface (5) except 11. In an embodiment of the present disclosure, the square playing board is distinctively colored.

In another aspect, the set of game coins of the board game includes a plurality of movements of coin position includes staircase with deeper steps. In addition, the staircase with deeper steps allows the set of game coins to move at least three steps, where each step is played two rows down and column right from its initial position based on the predefined criteria. Further, the predefined criteria define that if there is an attacking game coin at the end of the staircase step, the step cannot be taken by the player. Also, the predefined criteria define that if there is a defensive game coin at the end of the staircase step, the step cannot be taken by the player. Also, the predefined criteria define that if there is any game coin in between the step, the set of game coins can be jumped over.

The plurality of movements include staircase with longer steps. In addition, the staircase with longer steps allows the set of game coins to move at least three steps, where each step is played one rows down and two columns right from its initial position based on the predefined criteria. Further, the predefined criteria define that if there is an attacking game coin at the end of the staircase step, the step cannot be taken by the player. Also, the predefined criteria define that if there is a defensive game coin at the end of the staircase step, the step cannot be taken by the player. Also, the predefined criteria define that if there is any game coin in between the step, the set of game coins can be jumped over.

The plurality of movements includes unrestricted vertical slide. The unrestricted vertical slide refers to movement of the set of game coins from any one row to any other row in a straight line. The unrestricted vertical slide allows the set of game coins to move in up to down manner, down to up manner, but cannot jump over any attacking or defensive coin present in between.

The plurality of movements includes restricted vertical slide. The restricted vertical slide refers to the movement of the set of game coins in up to down manner, or down to up manner. The restricted vertical slide allows the set of game coins to jump over any attacking or defensive coin present in between, wherein the movement of the set of game coins are restricted to number of row equal to number of attacking coin.

The plurality of movements includes restricted vertical flight. The restricted vertical flight refers to the movement of the set of game coins in up to down manner, or down to up manner. The restricted vertical slide allows the set of game coins to jump over any attacking or defensive coin present in between. The movement of the set of game coins are restricted to number of row equal to number of attacking coin.

The plurality of movements includes restricted horizontal flight. The restricted horizontal flight refers to the movement of the set of game coins in right to left manner, or left to right manner. The restricted horizontal flight allows the set of game coins to jump over any attacking or defensive coin present in between. The movement of the set of game coins are restricted to number of columns equal to number of attacking coin.

The plurality of movements includes restricted horizontal slide. The restricted horizontal slide refers to the movement of the set of game coins in right to left manner, or left to right manner. The restricted horizontal flight prevents the set of game coins to jump over any attacking or defensive coin present in between. The movement of the set of game coins are restricted to number of columns equal to number of attacking coin.

The plurality of movements includes a 45 o move. The 45 o move refers to a movement of the set of game coins along a track defined as any number of columns to right and same number of rows upward, any number of columns to left and same number of rows downward. The 45 o move prevents the movement of the set of game coins over any coins on track.

The plurality of movements includes a 135 o move. The 135 o move refers to a movement of the set of game coins along a track defined as any number of columns to right and same number of rows upward, any number of columns to left and same number of rows downward. The 135 o move prevents the movement of the set of game coins over any coins on track. The plurality of movements includes a king's move. The king's move refers to the movement of one step to any of 8 abutting squares in the board game.

The plurality of movements includes white knight's move. The white knight's move refers to the movement of the set of game coins from 2nd column to left and one row upward, 2nd column to left and one row downward, 2nd column to right and one row upward, and 2nd column to right and one row downward. The white knight's move allows the set of game coins to jump over any coins in any direction.

The plurality of movements includes black knight's move. The black knight's move refers to the movement of the set of game coins from 3 columns to left and one row downward, 3 columns to right and one row upward, 4 columns to right and one row upward, and 4 columns to right and one row downward. The white knight's move allows the set of game coins to jump over any coins in any direction.

In an embodiment of the present disclosure, the board game defines the movement set for the set of game coins. The set of game coins (f) are marked with indicia, such as I, II, III, IV, V, VII, XI, and #. The set of the game coins marked with the indicia I follows king's move. The set of the game coins marked with the indicia II follows unrestricted vertical slide and restricted horizontal flight. The set of the game coins marked with the indicia III follows restricted horizontal flight, staircase with deeper steps, restricted vertical flight and 45o move. The set of the game coins marked with the indicia IV follows staircase with longer steps, and white knight's move. The set of the game coins marked with the indicia V follows unrestricted vertical slide, restricted horizontal flight. The set of the game coins marked with the indicia VII follows restricted horizontal slide, restricted vertical slide, restricted vertical slide, black knight's move, and staircase with deeper steps. The set of the game coins marked with the indicia XI follows the 135 o move. The set of the game coins marked with indicia # follows restricted horizontal slide.

In yet another aspect, the present disclosure relates to a method of playing a board game. The method includes a step to initiate game rules. The game rules defines that the player playing at a playing side (A) with the first set of game coins attacks and eliminates the second set of the game coins of the player playing at the playing side. The method includes another step to arrange the first and the second set of game coins (f) and (s) on a playing sides (A, D) of a playing surface of the board game. The method includes yet another step to allow each player to alternatively move one of the game coins (f) or (s) assigned to the players over the playing surface with aim to eliminate the game coin marked with an indicia Hash (#) of an opponent. The method includes yet another step to win the board game. The board game is won by the player eliminating maximum game coins of the opponent and score more points than the opponent. The player at the playing side (A) attacks the playing side (D) by moving any of the game coin (f, s) during first half of the board game. The player at playing side (D) defends against the playing side (A) by moving the indicia Hash (#) either three places or three Hash (#) indicia on one place each. The position of the players is interchanged in other half of the board game. The player eliminating the indicia Hash (#) in less time or in a lesser number of moves is declared winner of the board game.

In an embodiment of the present disclosure, the board game is played on internet or other means of game play and accordingly displayed on the monitor, a television screen, a mobile phone or other suitable device.

In yet another aspect, the present disclosure relates to a system for playing the board game. The system includes one or more processors and a memory coupled to the one or more processors, the memory for storing instructions which, when executed by the one or more processors, cause the one or more processors for displaying the board game on a plurality of devices, the system is configured to carry out the step of setting up a first and a second set of game coins (f) and (s) on a playing sides (A, D) of a playing surface of the board game. The system is configured to carry out the step of displaying the board game and the game coins on a display.

The system is configured to carry out the step of storing means for storing location information of the game coins (f) or (s) and rules information. The system is configured to carry out the step of allowing each player to alternatively move one of the game coins (f) or (s) assigned to the players over the playing surface with aim to eliminate the game coin marked with an indicia Hash (#) of an opponent to win the game when the game is not played in time restricted version or to eliminate the maximum game coins of the opponent and score more points than the opponent to win the game when the game is played in time restricted version.

Each player moves the game coins (f) or (s) using an input device. The position of the players is interchanged in other half of the board game. The player eliminating the indicia Hash (#) in less time or in a lesser number of moves is declared winner of the board game. Each player moves the game coins (f) or (s) using an input device. The board game comprising 100 abutting small squares arranged in 10 rows and 10 columns, the 10 rows extending from the attacking side to the defending side. In addition, each abutting small square is marked with a number from 1 to 100 such that numbering arrangement of the abutting units in the first row on playing surface begins from 1, and sequentially goes till 10 and further continued in likewise manner for further rows by numbering the abutting units of next immediately adjacent rows with 10 digits higher numbers than the number mentioned on its adjacent abutting unit of previously numbered row. The numbering arrangement of the abutting units in the last row on the playing surface begin with 91 to go sequentially and end with 100.

In an embodiment of the present disclosure, the plurality of devices comprising mobile, television, and gaming consoles. In an embodiment of the present disclosure, input device comprising keyboard, mouse, touchpad, microphone, touchscreen, trackball, and joystick. In an embodiment of the present disclosure, the said board game is provided via a network to said each of players.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
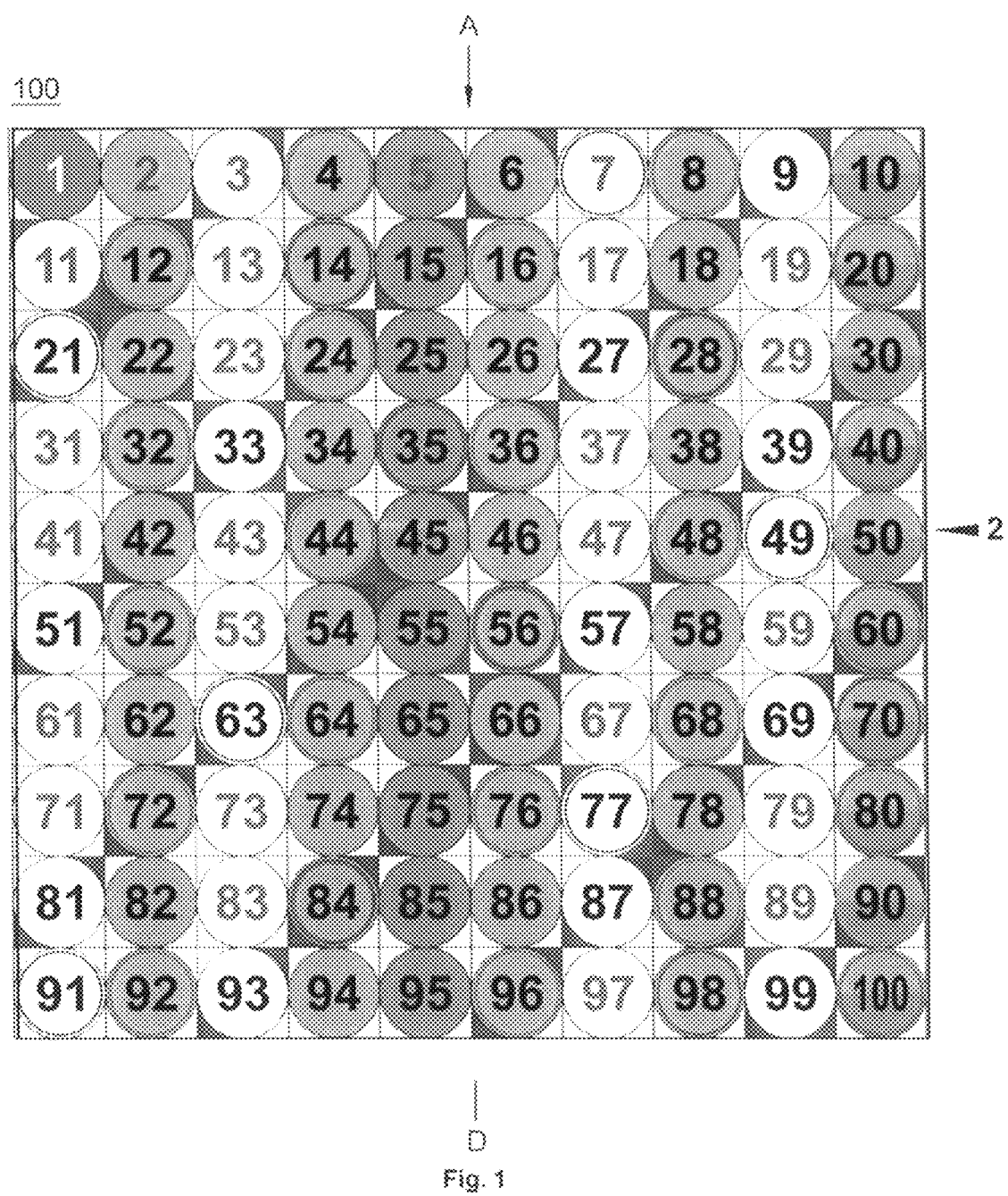
FIG. 1 is a perspective view of a playing surface of a board game with color scheme, in accordance with various embodiments of the present disclosure.

The embodiments herein and the various features and advantageous details thereof are explained more fully with reference to the non-limiting embodiments that are illustrated in the following detailed description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The terms like can be, shall be, could be, and other related terms herein disclosed in the foregoing and later parts of the specification in any means do not limit or alter the scope of the present invention. The terms are provided just for the mere understanding of the main invention and its embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The invention relates to a board game apparatus which help students learn math facts at the same time as developing number sense. It is simple in construction, convenient in operation and inexpensive to manufacture.

The present board game is designed to entertain and provide educational stimulation for both adults and children. It is a useful arithmetic tutoring device which can be played and enjoyed by players of widely varying ages and/or ability. The board game is based on number relationship which helps the players to test and familiarize themselves with arithmetic relations in a pleasant and entertaining manner and without the aid of an instructor.

More particularly, the apparatus of the present invention is an arithmetic device which may be utilized for teaching and developing the concept of number multiples in a challenging and entertaining way. As per the classical definition of 'Multiple', the product of a number with any integer is called the multiple of that number. In other words, 'Multiple' is a number that may be divided by another number with no remainder.

The present invention provides for an apparatus of the board game 100 comprising of a square playing board 2 and a plurality of game coins (f, s) as hereinafter described.

Figure 2:
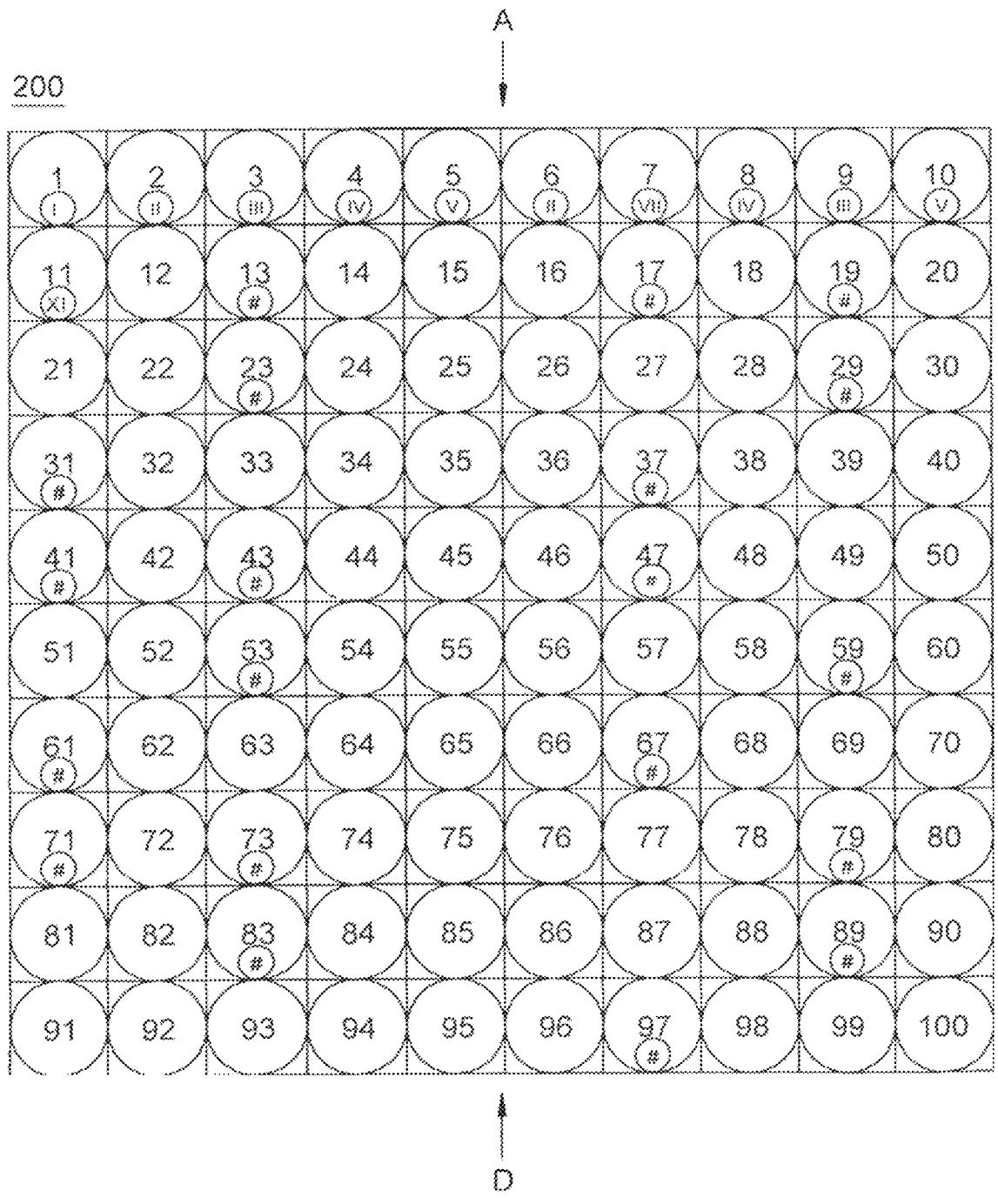
FIG. 2 is a perspective view of an arrangement of game coins on the playing surface of the board game.

FIG. 1 is a perspective view of a playing surface of a board game 100 with color scheme, in accordance with various embodiments of the present disclosure. FIG. 2 is a perspective view of a playing surface of the board game 100, in accordance with various embodiments of the present disclosure. The disclosure related to a square playing board shown in FIG. 1 and FIG. 2. In an embodiment of the present disclosure, the board game 100 includes a square playing board, a first set of game coins and the second set of game coins. The square playing board comprising a playing surface and two opposite playing sides (A, D). In addition, the two opposite playing sides comprising an attacking side (A) and a defending side (D), a first player, known as attacker, plays from the attacking side and a second player, known as defender, plays from the defending side. In an embodiment of the present disclosure, the playing surface is marked with 100 abutting small squares arranged in 10 rows and 10 columns, the 10 rows extending from the attacking side to the defending side. In addition, each abutting small square is marked with a number from 1 to 100 such that numbering arrangement of the abutting units in the first row on playing surface begins from 1, and sequentially goes till 10 and further continued in likewise manner for further rows by numbering the abutting units of next immediately adjacent rows with 10 digits higher numbers than the number mentioned on its adjacent abutting unit of previously numbered row. The numbering arrangement of the abutting units in the last row on the playing surface begin with 91 to go sequentially and end with 100. The first set of game coins (f), containing 1 game coin marked with indicia I, 2 game coins marked with indicia II, 2 game coins marked with indicia III, 2 game coins marked with Indicia IV, 2 game coins marked with indicia V, 1 game coins marked with indicia VII and 1 game coin marked with indicia XI. In addition, the second set of game coins consists of 20 game coins marked with indicia Hash (#). The attacker is allotted the first set of game coins (f) and the defender is allotted the second set of game coins (s). Each turn, the attacker attacks defender by moving any 1 game coin from first set of game coins (f), and the defender defends attacker by moving either three game coins from second set of game coins into 1 abutting small square each or one game coin from second set of game coins 3 abutting small squares. In addition, the position of the players is interchanged in other half of the board game. The player eliminating the indicia Hash (#) in less time or in a lesser number of moves is declared the winner of the board game. Each of the 100 abutting small squares are marked with a pattern that is indicative of the which of the coins from the first set of game coins may occupy that abutting small square.

The board game 100 with color scheme represents the potential moves of the game coins (f, s). In an embodiment of the present disclosure, the numbering arrangement in the board game 100 with color scheme containing prime number is characterized by a color. In addition, the color of the prime number is marked with red. In another embodiment of the present disclosure, the numbering arrangement in the board game 100 with color scheme containing prime number may be of any color. In an embodiment of the present disclosure, the numbering arrangement in the board game 100 with color scheme containing composite number is characterized by the color. In addition, the color of the composite number in the board game 100 with color scheme is marked with black. In another embodiment of the present disclosure, the numbering arrangement containing composite number may be of any color.

The board game 100 with color schemes contains 10×10 square blocks. In addition, each square block includes a circular block. Further, each circular block includes a number inside them. In an embodiment of the present disclosure, the circular block marked with a number 1 is colored with orange color. The circular block marked with a two-digit number having a last digit number 1 is colored with white color. The circular block marked with a multiple of 2 is colored with pink color. The circular block marked with a series of number 3 is colored with white color. The circular block marked with a series of number 7 is colored with white color. The circular block marked with a series of number 9 is colored with white color. The circular block marked with a series of number 5 is colored with green color. The circular block marked with a series of number 10 is colored with green color and pink color. The board game 100 represents potential movements of the game coins (f, s) using color schemes. The board game 100 containing the block numbered with multiple of 3 is colored with blue color at the corner (as shown in FIG. 1). The board game 100 containing the block numbered with multiple of 11 is colored with red color at the corner (as shown in FIG. 1). The board game 100 containing the block numbered with multiple of 4 is encircling the number with dark green color (as shown in FIG. 1). The board game 100 containing the block numbered with multiple of 7 is encircling the number with green color (as shown in FIG. 1). In an embodiment of the present disclosure, the color scheme used in the board game 100 may be of any color.

In an embodiment of the present disclosure, the game coins are divided into a first set of game coins (f) and a second set of game coins (s), one for each player. The game coins are marked with indicia, wherein the kind of indicia governs the movement of the corresponding game coin on the playing board. In an embodiment of the present disclosure, the board game 100 includes an instructional manual which may be a book, or a record stored in electronic form specifying logical structure of the game. More specifically, it contains: (a) Assembly or setup instructions explaining the placement of the playing coins (A, D) on the playing surface of the square playing board, (b) a set of possible actions/moves by the players for development of the game, (c) rules that govern the start and the end of the game, (d) Any additional information to impart knowledge about the board game 100 including its construction, working etc.

In order to more easily understand the constitution of the structure of the invention, as well as the possibilities of the development of play therewith, a more detailed description of the structure will be made below with the aid of the accompanying drawings. FIG. 2 illustrates the setting up of the board game 100. In an embodiment of the present disclosure, the board game 100 specifically is designed for use with two players. In addition, each player is assigned either the first set of game coins (f) or the second set of game coins (s). In an embodiment of the present disclosure, the set of game coins (f, s) are distinctively colored.

In an embodiment of the present disclosure, the first and the second set of game coins (f) and (s) are arranged on the opposing playing sides (A, D) of the playing surface respectively. In addition, the position of every game coin, as depicted in FIG. 2, is referred to as the 'Start Position' of that particular game coin.

The board game consists of the set of game coins. The set of game coins includes plurality of movements. In an embodiment of the present disclosure, the one or more type of moves include staircase with deeper steps. In addition, the staircase with deeper steps allows the set of game coins to move at least three steps, where each step is played two rows down and column right from its initial position based on the predefined criteria. Further, the predefined criteria define that if there is an attacking game coin at the end of the staircase step, the step cannot be taken by the player. Also, the predefined criteria define that if there is a defensive game coin at the end of the staircase step, the step cannot be taken by the player. Also, the predefined criteria define that if there is any game coin in between the step, the set of game coins can be jumped over.

The plurality of movements includes staircase with longer steps. In addition, the staircase with longer steps allows the set of game coins to move at least three steps, where each step is played one rows down and two columns right from its initial position based on the predefined criteria. Further, the predefined criteria define that if there is an attacking game coin at the end of the staircase step, the step cannot be taken by the player. Also, the predefined criteria define that if there is a defensive game coin at the end of the staircase step, the step cannot be taken by the player. Also, the predefined criteria define that if there is any game coin in between the step, the set of game coins can be jumped over.

The plurality of movements includes unrestricted vertical slide. The unrestricted vertical slide refers to movement of the set of game coins from any one row to any other row in a straight line. The unrestricted vertical slide allows the set of game coins to move in up to down manner, down to up manner, but cannot jump over any attacking or defensive coin present in between.

The plurality of movements includes restricted vertical slide. The restricted vertical slide refers to the movement of the set of game coins in up to down manner, or down to up manner. The restricted vertical slide allows the set of game coins to jump over any attacking or defensive coin present in between, wherein the movement of the set of game coins are restricted to number of row equal to number of attacking coin, e.g., 7 rows for indicia VII.

The plurality of movements includes restricted vertical flight. The restricted vertical flight refers to the movement of the set of game coins in up to down manner, or down to up manner. The restricted vertical slide allows the set of game coins to jump over any attacking or defensive coin present in between. The movement of the set of game coins are restricted to number of row equal to number of attacking coin, e.g., 3 rows for indicia III.

The plurality of movements includes restricted horizontal flight. The restricted horizontal flight refers to the movement of the set of game coins in right to left manner, or left to right manner. The restricted horizontal flight allows the set of game coins to jump over any attacking or defensive coin present in between. The movement of the set of game coins are restricted to number of columns equal to number of attacking coin i.e. 2 Column for indicia II, 3 Column for indicia III and 5 Column for indicia V.

The plurality of movements includes restricted horizontal slide. The restricted horizontal slide refers to the movement of the set of game coins in right to left manner, or left to right manner. The restricted horizontal flight prevents the set of game coins to jump over any attacking or defensive coin present in between. The movement of the set of game coins are restricted to number of columns equal to number of attacking coin i.e. 7 Column for indicia VII, 1 or 3 for indicia # defensive pieces.

The plurality of movements includes 45 o move. The 45 o move refers to a movement of the set of game coins along a track defined as any number of columns to right and same number of rows upward, any number of columns to left and same number of rows downward. The 45 o move prevents the movement of the set of game coins over any coins on track.

The plurality of movements includes 135 o move. The 135 o move refers to a movement of the set of game coins along a track defined as any number of columns to right and same number of rows upward, any number of columns to left and same number of rows downward. The 135 o move prevents the movement of the set of game coins over any coins on track.

The plurality of movements includes king's move. The king's move refers to the movement of one step to any of 8 abutting squares in the board game.

The plurality of movements includes white knight's move. The white knight's move refers to the movement of the set of game coins from 2nd column to left and one row upward, 2nd column to left and one row downward, 2nd column to right and one row upward, and 2nd column to right and one row downward. The white knight's move allows the set of game coins to jump over any coins in any direction.

The plurality of movements includes black knight's move. The black knight's move refers to the movement of the set of game coins from 3 columns to left and one row downward, 3 columns to right and one row upward, 4 columns to right and one row upward, and 4 columns to right and one row downward. The white knight's move allows the set of game coins to jump over any coins in any direction.

In an embodiment of the present disclosure, the board game defines the movement set for the set of game coins. The set of game coins (f) are marked with an indicia, such as I, II, III, IV, V, VII, XI, and #. The set of the game coins marked with the indicia I follows king's move. The set of the game coins marked with the indicia II follows unrestricted vertical slide and restricted horizontal flight. The set of the game coins marked with the indicia III follows restricted horizontal flight, staircase with deeper steps, restricted vertical flight and 45 o move. The set of the game coins marked with the indicia IV follows staircase with longer steps, and white knight's move. The set of the game coins marked with the indicia V follows unrestricted vertical slide, restricted horizontal flight. The set of the game coins marked with the indicia VII follows restricted horizontal slide, restricted vertical slide, restricted vertical slide, black knight's move, and staircase with deeper steps. The set of the game coins marked with the indicia XI follows 135 o move. The set of the game coins marked with indicia # follows restricted horizontal slide.

Figure 3:
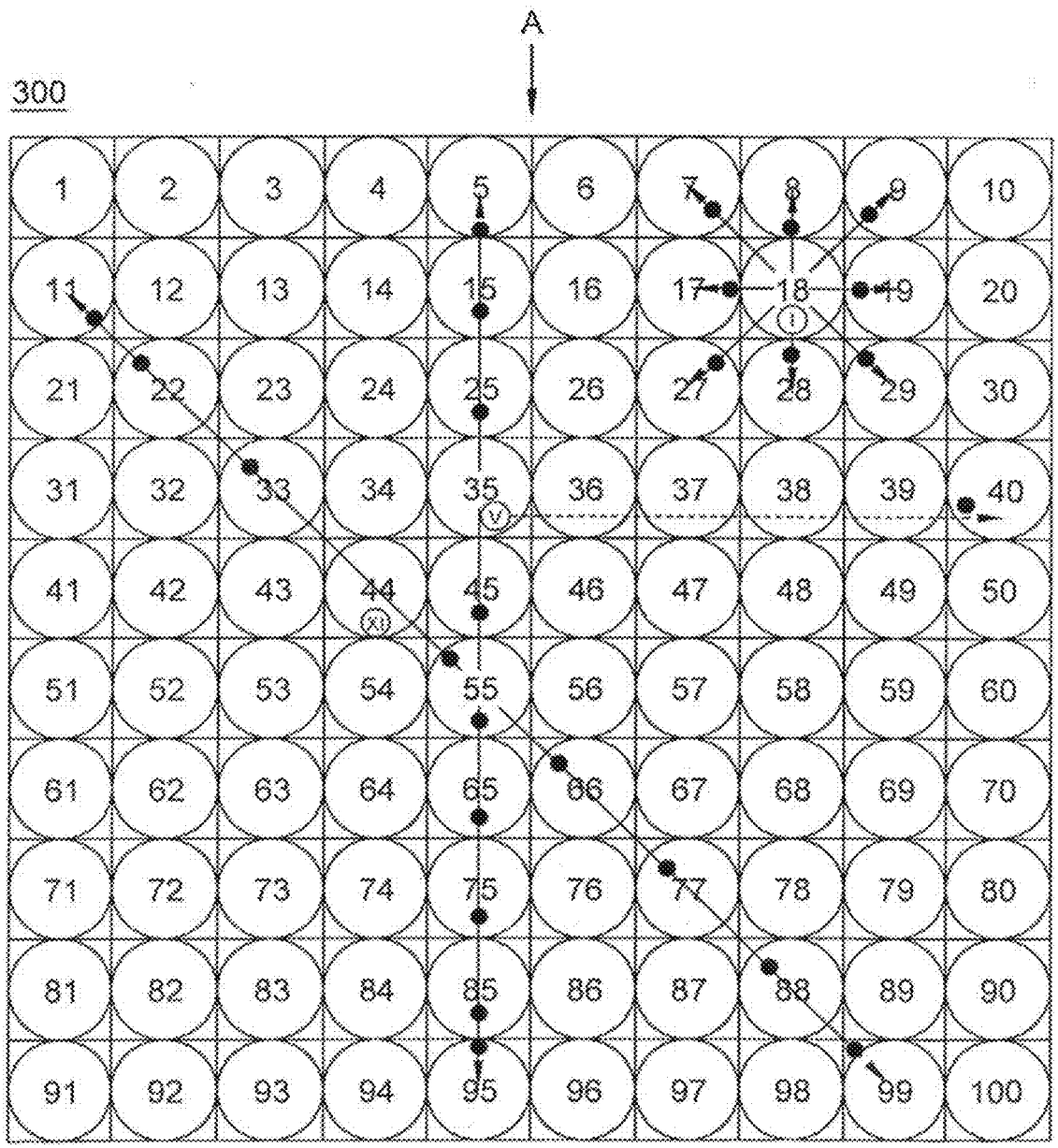
FIG. 3 is a view of an embodiment movement of the game coins marked with indicia: I and XI.
Figure 4:
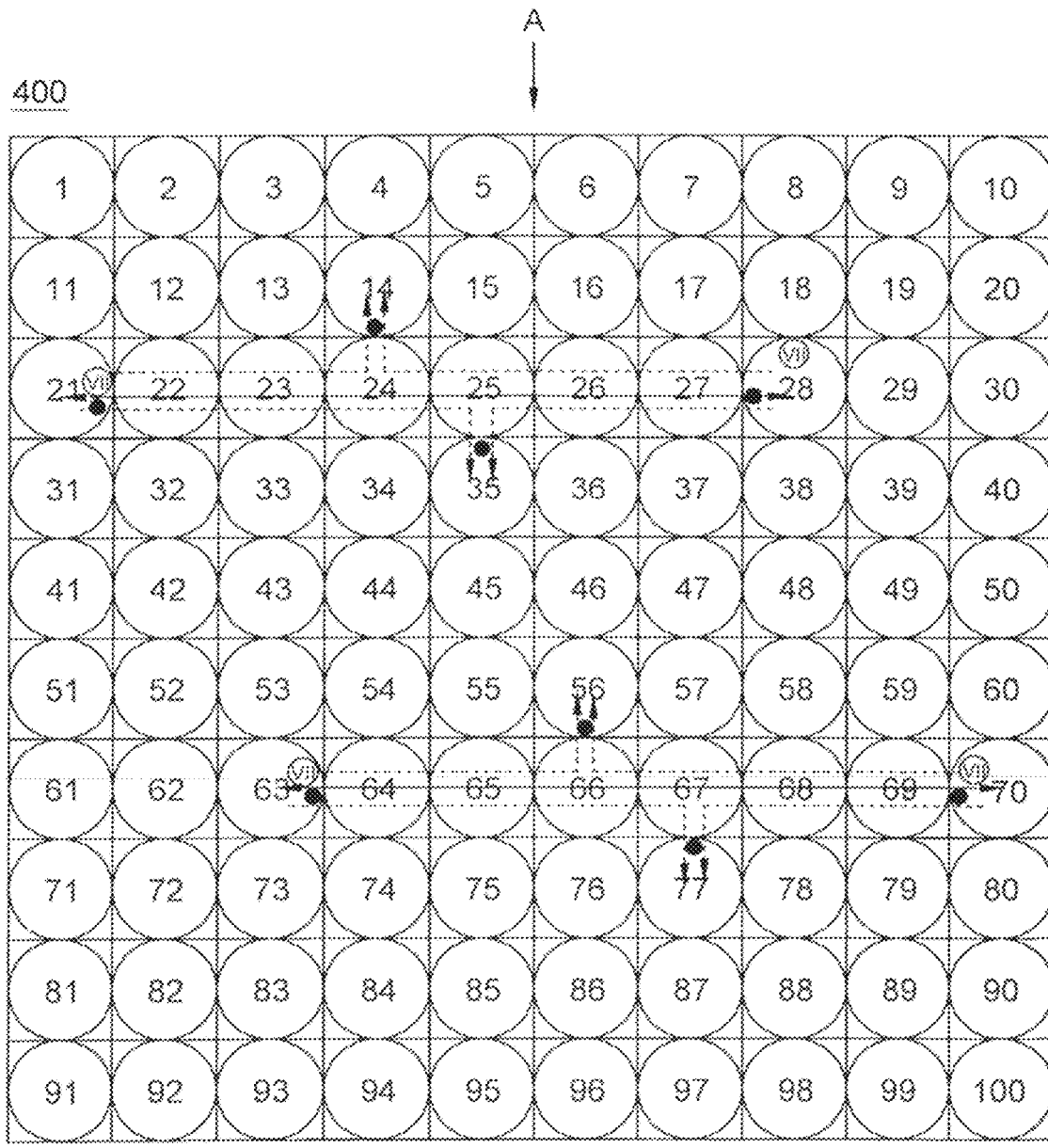
FIG. 4 is a view of an embodiment movement of the game coin marked with indicia: VII.
Figure 5:
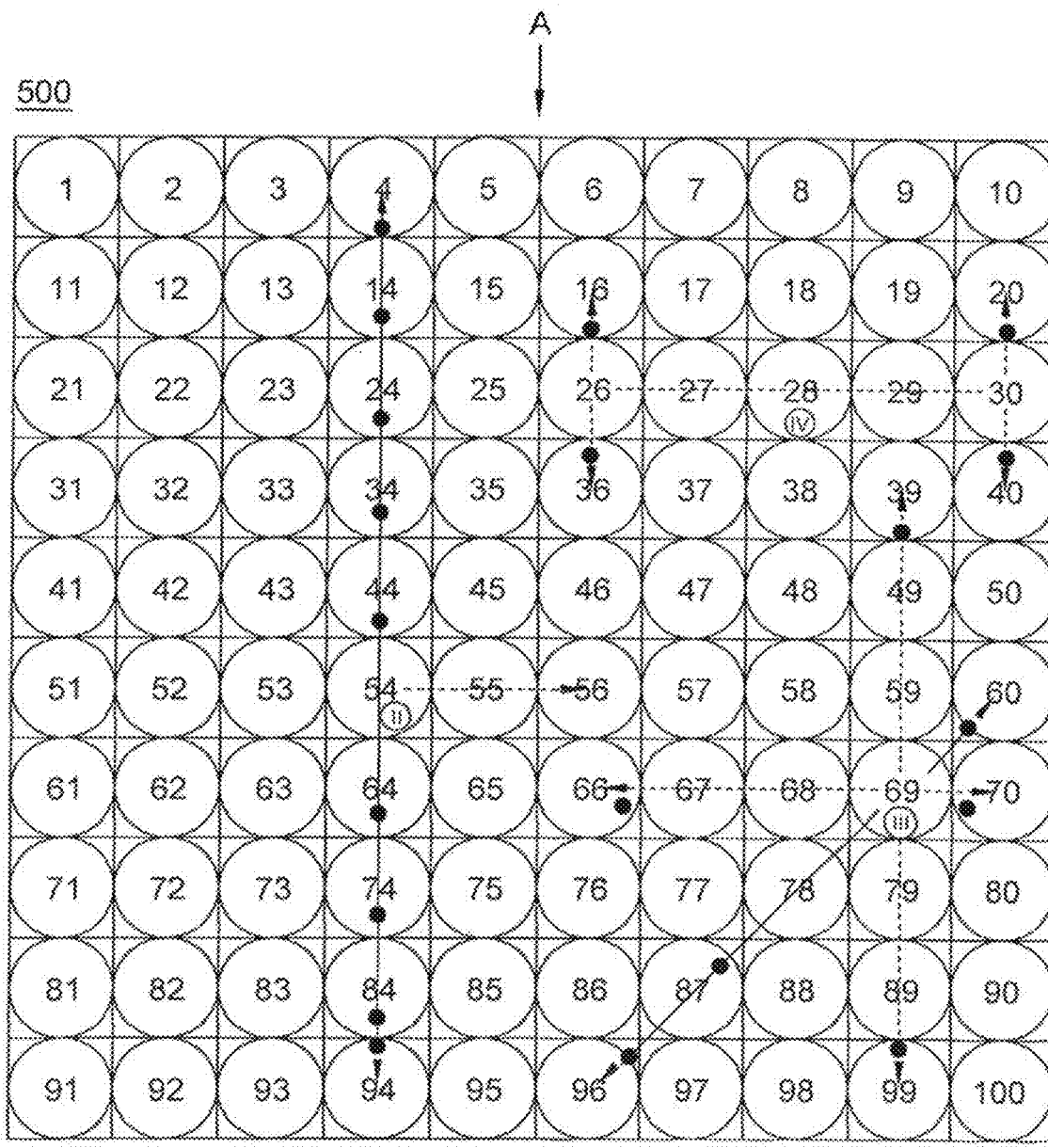
FIG. 5 is a view of an embodiment movement of the game coins marked with indicia: II, III, and IV.
Figure 6:
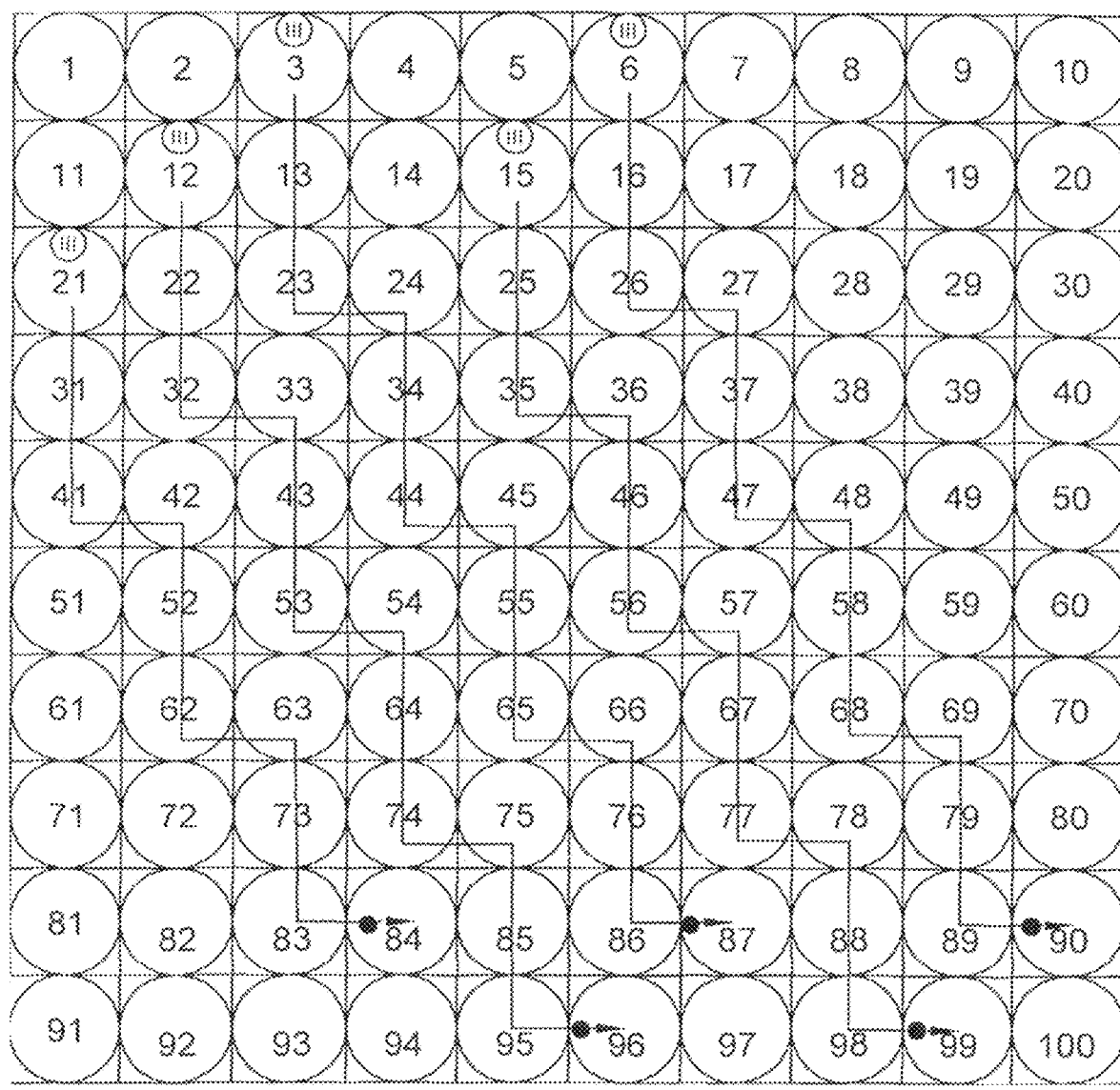
FIG. 6 is a view of another embodiment movement of the game coins marked with indicia: III.
Figure 7:
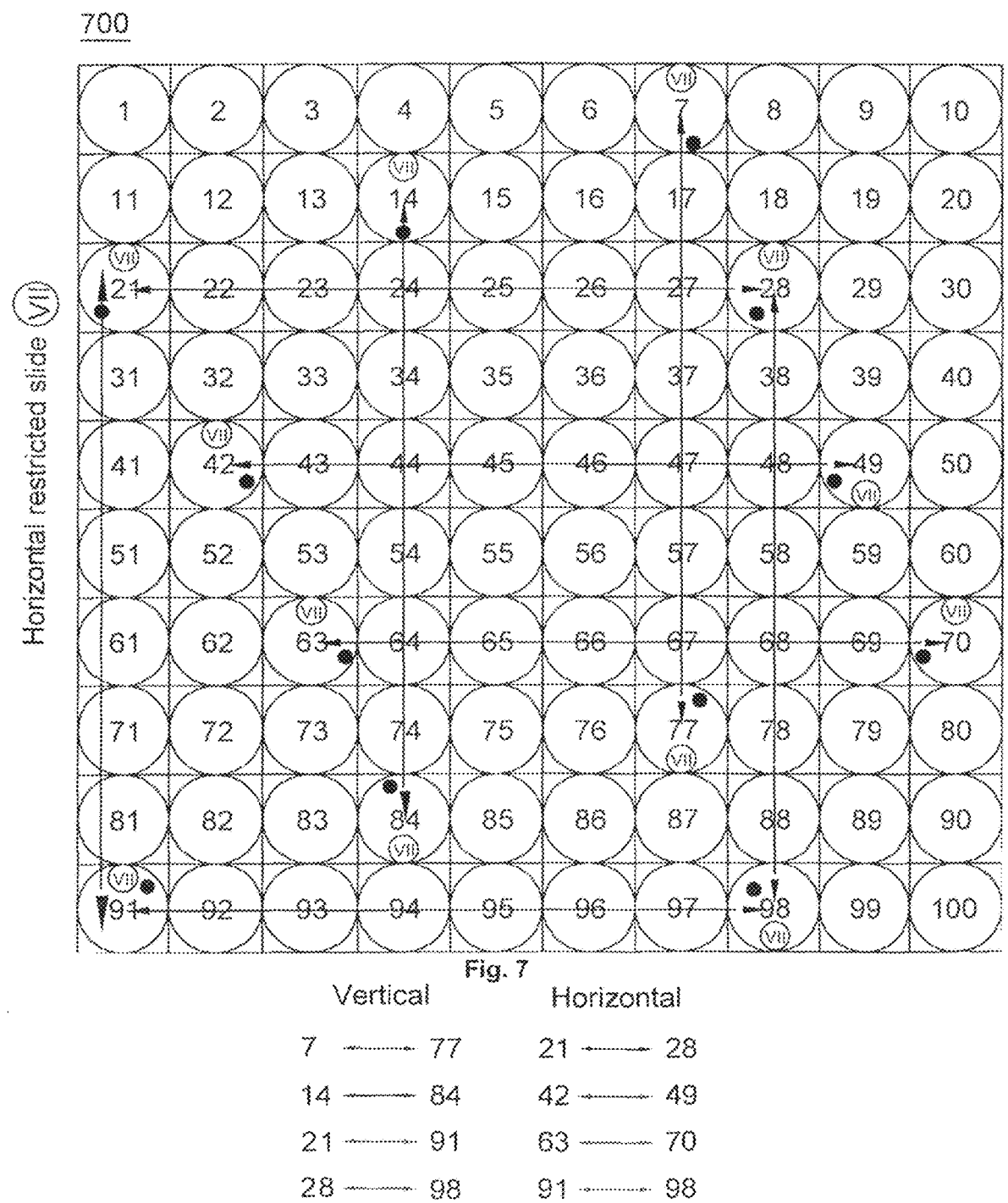
FIG. 7 is a view of another embodiment movement of the game coin marked with indicia: 7.
Figure 8:
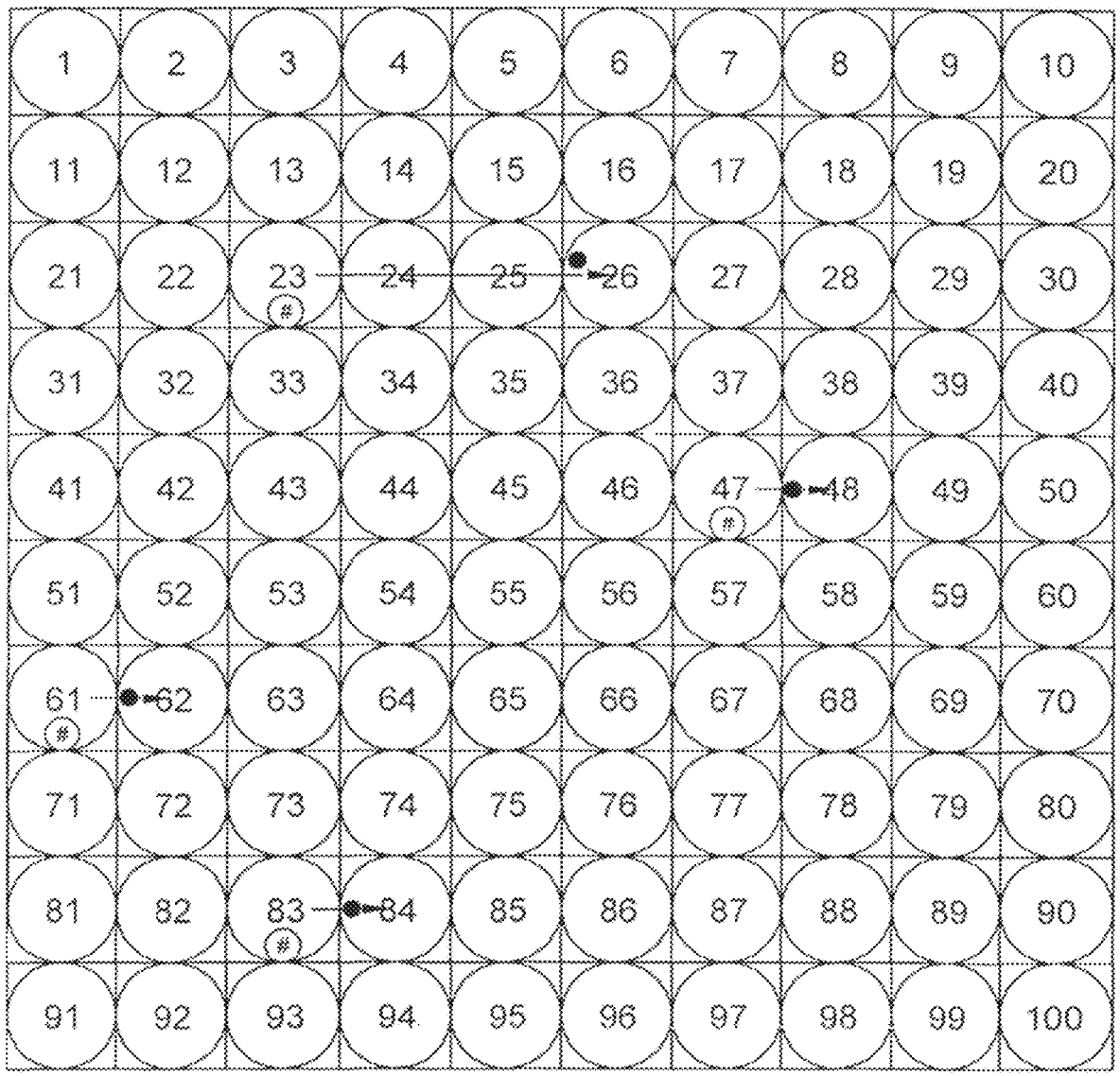
FIG. 8 is a view of an embodiment movement of the game coin marked with indicia: #.
Figure 9:
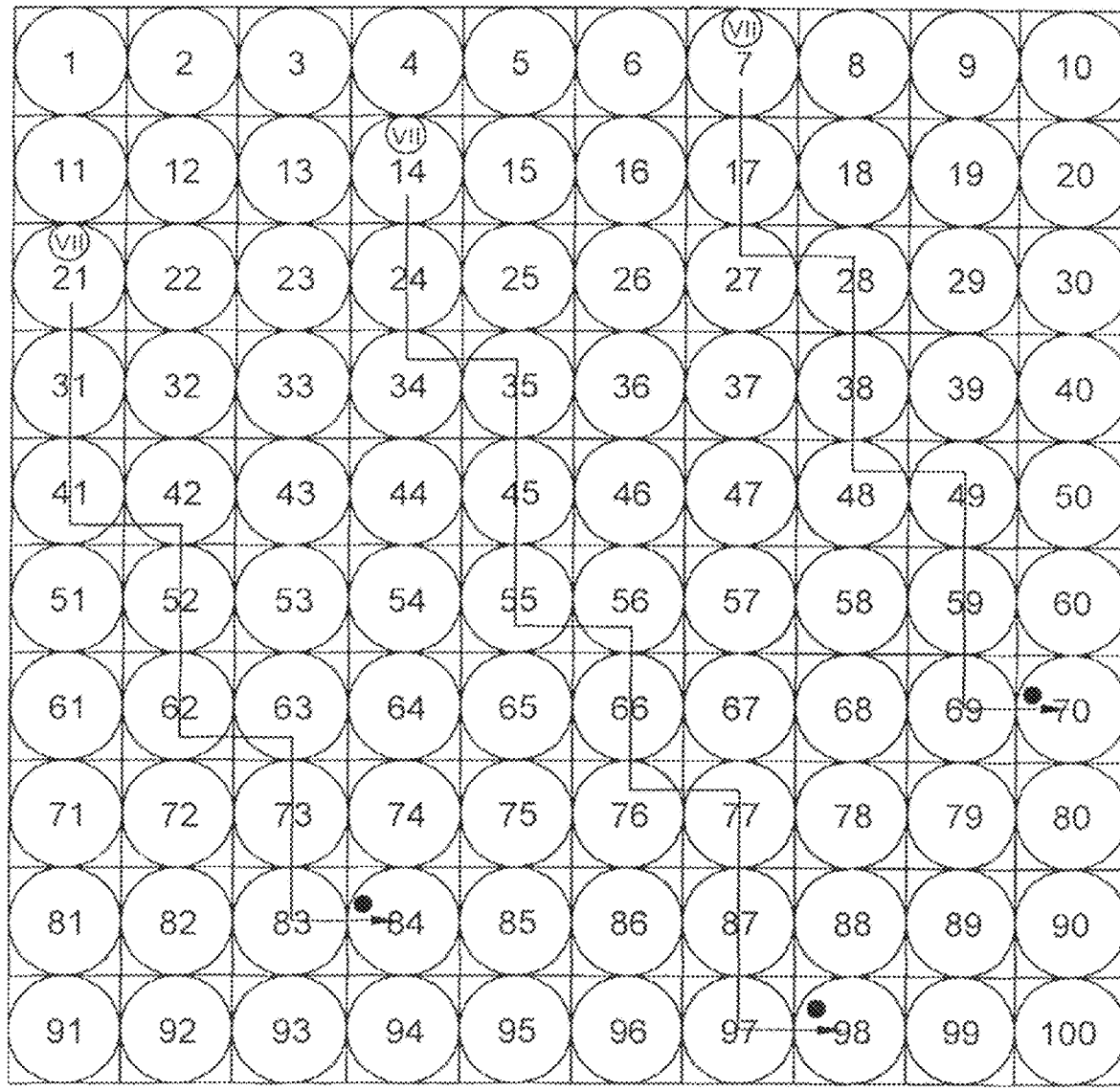
FIG. 9 is a view of yet another embodiment movement of the game coin marked with indicia: VII.
Figure 10:
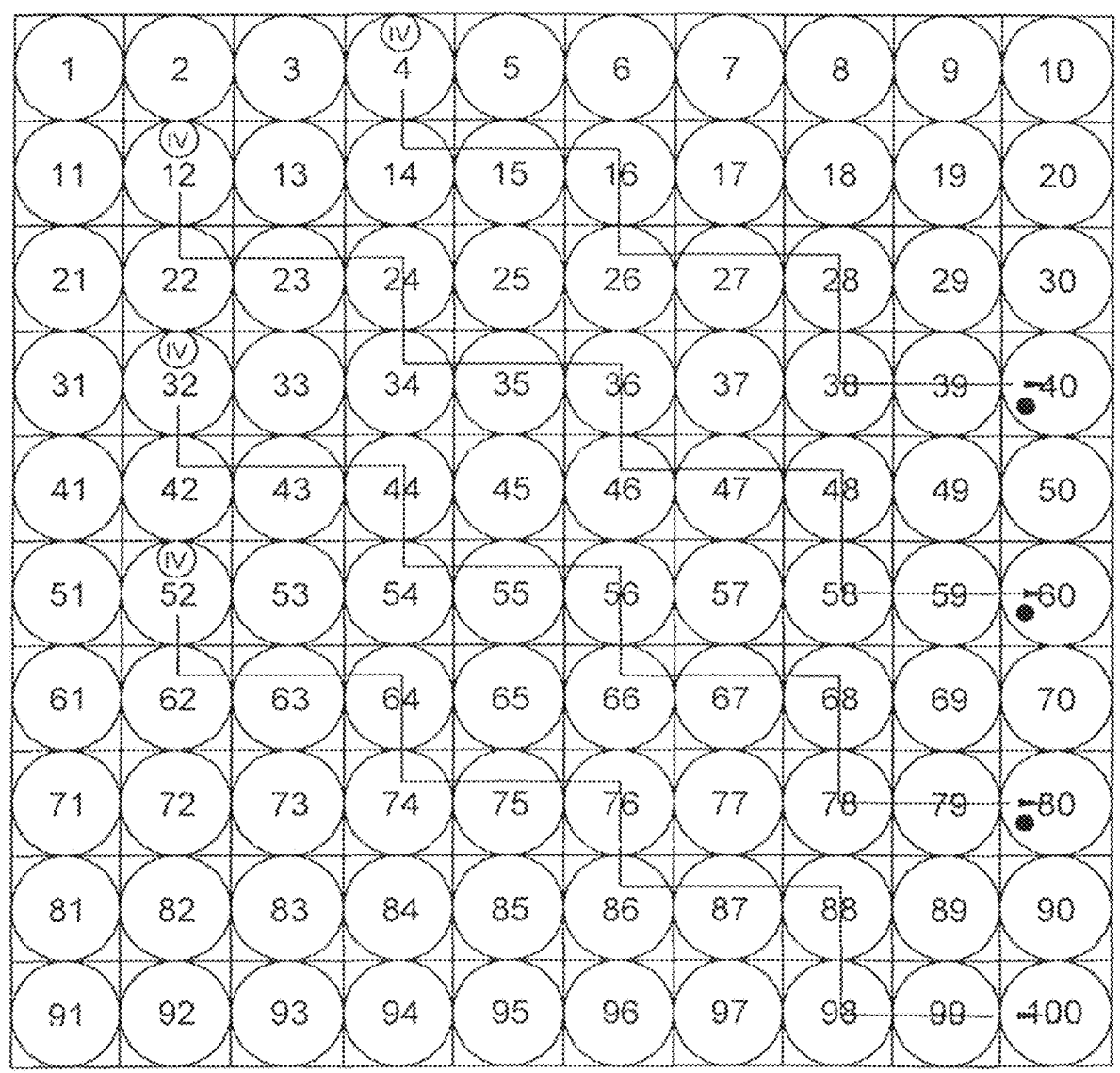
FIG. 10 is a view of another embodiment movement of the game coin marked with indicia: IV.

FIG. 3 is a view 300 of an embodiment movement of the game coins marked with indicia: I and XI. FIG. 4 is a view 400 of an embodiment movement of the game coin marked with indicia: VII. FIG. 5 is a view 500 of an embodiment movement of the game coins marked with indicia: II, III, and IV. FIG. 6 is a view 600 of another embodiment movement of the game coin marked with indicia: III. FIG. 7 is a view 700 of another embodiment movement of the game coin marked with indicia: XII. FIG. 8 is a view 800 of an embodiment movement of the game coin marked with indicia: #. FIG. 9 is a view 900 of yet another embodiment movement of game coin marked with indicia: VII. FIG. 10 is a view 1000 of another embodiment movement of the game coin marked with indicia: IV.

In an embodiment of the present disclosure, after each player has positioned the set of game coins (f, s) on the playing board as shown in the FIG. 2, the game is commenced by either of the players, as decided mutually by both of them. In addition, the game develops in accordance with the rules of the game; when each player alternatively moves one of the game coins (f) or (s) assigned to that player over the playing surface. In other words, the object of the game for the players assigned with the first and second set of game coins (f) and (s) is to move the respective game coins (f, s) in alternate manner. Further, while moving the game coins f or s, the one player having the first set of game coins (f) try to eliminate the second set of the game coins (s) of the opponent. Furthermore, when game is played in time restricted version, then the aim is to eliminate maximum game coins of the opponent and score more points during the first half of the game. Moreover, during the other half of the game, position of the players is interchanged, and score is calculated in the same manner. In an embodiment of the present disclosure, the player at the playing side A attacks over the player at other playing side D using the first set of game coins. In addition, the player at the other playing side D defends from the first set of game coins utilized by the player at the playing side A to eliminate the game coins of the player at playing side D.

Accordingly, a method of playing the board game 100 includes the steps of: arranging the first and the second set of game coins (f) and (s) on the playing sides (A, D) of the playing surface. The method includes allowing each player to alternatively move one of the game coins (f) or (s) assigned to that player over the playing surface with aim to eliminate the game coin of the opponent to win the game when the game is not played in time restricted version or to eliminate the maximum game coins of the opponent and score more points than the opponent to win the game when the game is played in time restricted version, wherein the playing side A is allowed to attack the playing side D by moving any of the indicia at a time during first half of the board game 100, wherein the playing side D is allowed to defend from the playing side A by moving the indicia Hash (#) either three places or three Hash (#) indicia on one place each, wherein the position of the attacker and defender is interchanged in other half of the board game 100.

In an embodiment of the present disclosure, the board game includes many variants. In an example, let us consider a game type in which goal is to eliminate the game coin marked with an Indicia Hash (#) of the opponent using the indicia I, II, III, IV, V, VII and XI and score is declared. In addition, the end of the game is marked by loss of all the game coin marked with an indicia Hash (#) of the players at the playing side D in the game. Further, the winner of the game is the player who has eliminates all the game coin marked with indicia hash (#) in less time. Furthermore, the winner of the game can also be defined by counting number of moves of the attacker to kill all the game coin of the defender marked with indicia Hash (#). Moreover, the winner can also be the player who finishes in a lesser number of moves.

In an example, let us consider the number of players: Two (P and P') and the goal of the game is to maximize the total score by eliminating maximum game coins of the opponent in a game of stipulated time. In addition, both players, P and P', is allotted with a set of equal number of game coins, (f) and (s) respectively. Each set of game coins consists of two coins marked with indicia II, two coins marked with indicia III, two coins marked with indicia IV, two coins marked with indicia V, one coin marked with indicia VII, one coin marked with indicia XI, one coin marked with indicia I, and twenty coins marked with indicia Hash (#). Player P arranges his game coins on the playing side A, whereas player P' arranges his game coins on the playing side D of the playing surface, as per the arrangement show in FIG. 2.

Figure 11:
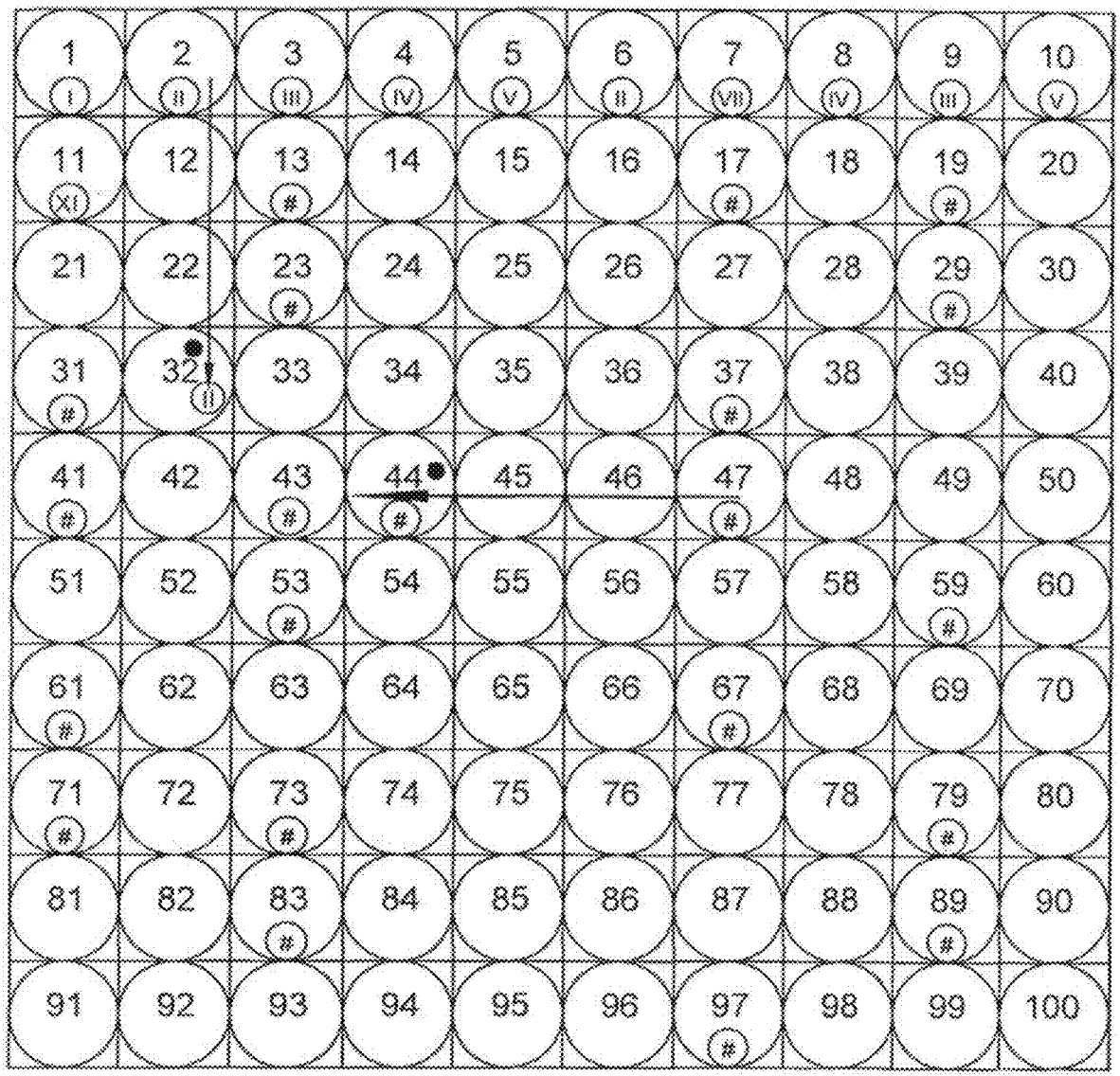
FIG. 11 shows an embodiment move no. 1 for both players.

With reference to FIG. 11, player X makes his first move viz. moving the game coin marked with indicia II from its start position to number 32. Following this, player X' makes his first move viz. moving the game coin marked with indicia Hash (#) from its start position 47 to number 44.

Figure 12:
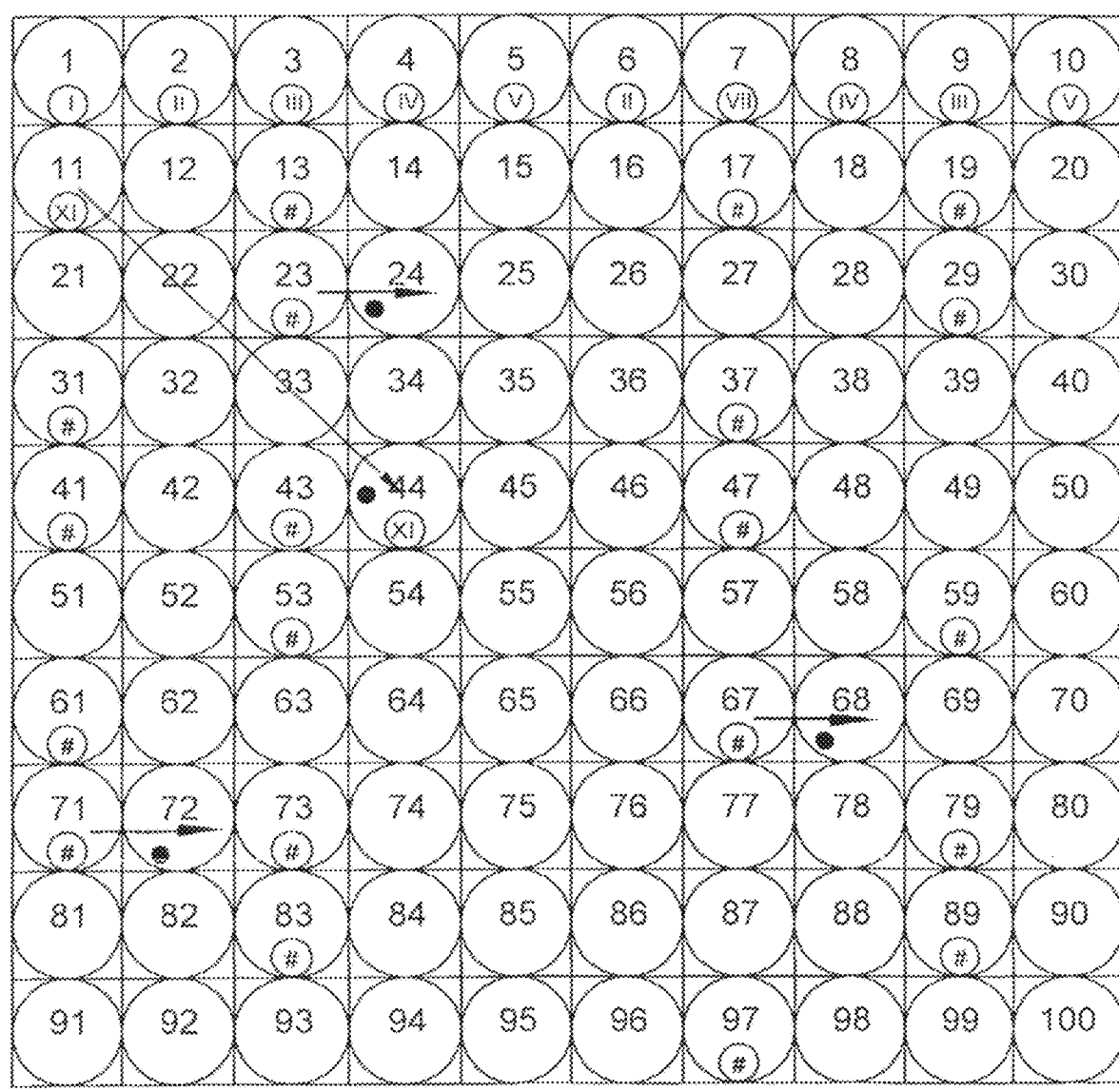
FIG. 12 shows an embodiment move no. 2 for both players.

With reference to FIG. 12, player X makes his second move viz. moving the game coin marked with indicia XI from its start position 11 to its multiple 44 and eliminates indicia #. Following this, player X' makes his second move viz. moving the game coin marked with indicia # from its start position 53 to 56.

After a few moves, player X eliminates all the indicia # of the player X' (say, 40 moves) during the first half of the game. In other half of the game, the position of the players (X, X') is interchanged. In addition, if the player X' eliminates the indicia # of the player X is moves less than 40, than player X' is declared as the winner of the game.

Figure 13:
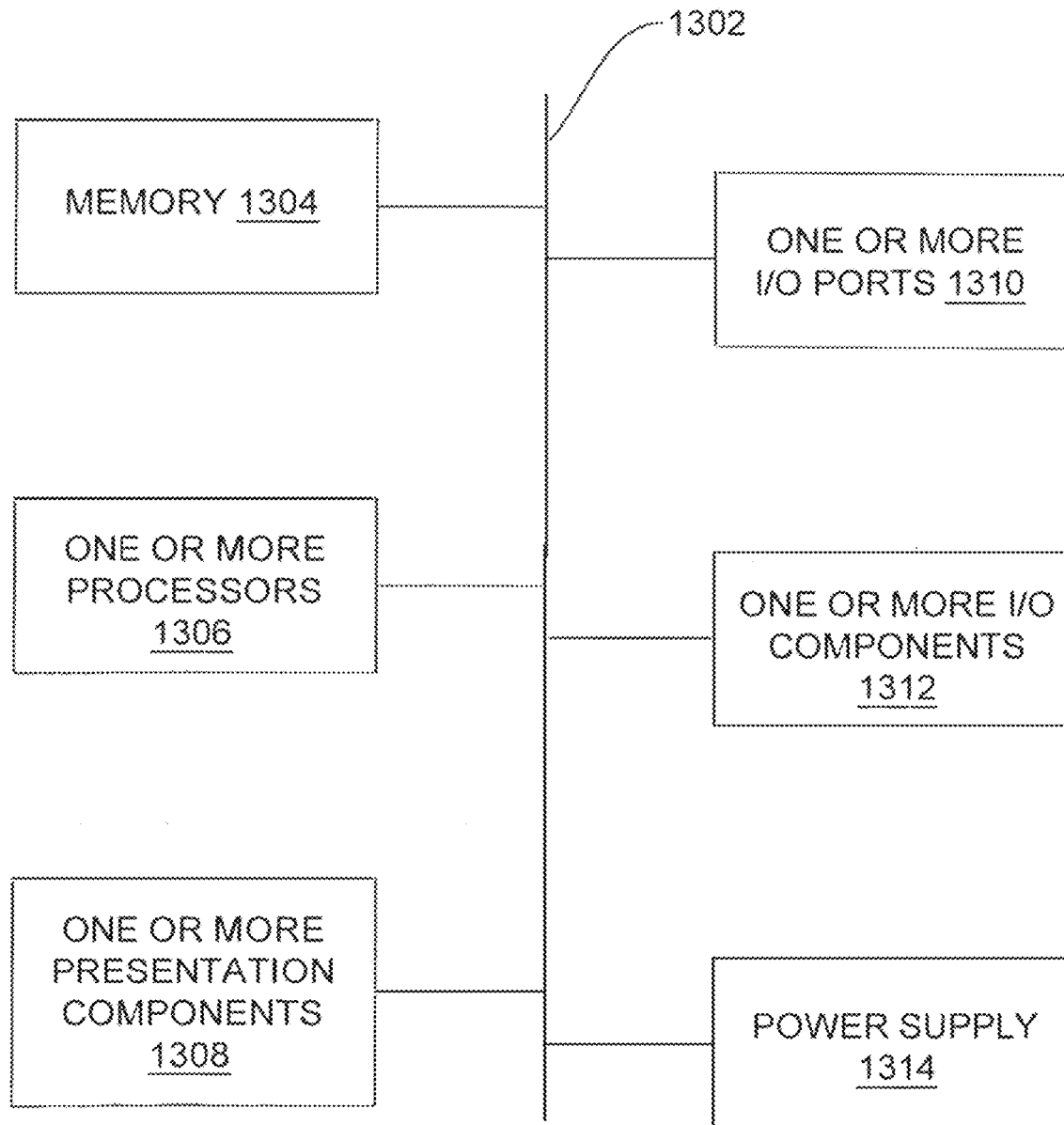
FIG. 13 illustrates a hardware framework of a system for playing the board game.

FIG. 13 illustrates a hardware framework 1300 of a system for playing the board game 100, in accordance with various embodiments of the present disclosure. The hardware framework 1300 is required to run the system. The hardware framework 1300 includes various components that work synchronously to enable processing of the system and allows storing of data in the system. The hardware framework 1300 includes a bus 1302 that directly or indirectly couples the following devices: memory 1304, one or more processors 1306, one or more presentation components 1308, one or more input/output (I/O) ports 1310, one or more input/output components 1312, and an illustrative power supply 1314. The bus 1302 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 13 is merely illustrative of an exemplary hardware framework 1300 that can be used in connection with one or more embodiments of the present invention. Distinction is not made between such categories as "workstation,"

"server," "laptop," "hand-held device," etc., as all are contemplated within the scope of FIG. 13 and reference to "hardware framework."

The hardware framework 1300 typically includes a variety of computer-readable media. The computer-readable media can be any available media that includes both volatile and nonvolatile media, removable and non-removable media. By way of example, and not limitation, the computer-readable media may comprise computer storage media and communication media. The computer storage media includes volatile and nonvolatile, removable, and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1304 includes computer-storage media in the form of volatile and/or nonvolatile memory. The memory 1304 may be removable, non-removable, or a combination thereof. Exemplary hardware devices include solid-state memory, hard drives, optical-disc drives, etc. The hardware framework 1300 includes the one or more processors 1306 that read data from various entities such as memory 1304 or I/O components 1312. The one or more presentation components 1308 present data indications to a user or other device. Exemplary presentation components include a display device, speaker, printing component, vibrating component, etc.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms mentioned.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for playing a board game, the system comprising:
    one or more processors; and
    a memory coupled to the one or more processors, the memory for storing instructions which, when executed by the one or more processors, cause the one or more processors for displaying the board game on a plurality of devices, wherein individual ones of the plurality of devices comprise a mobile device, television, and gaming console, the system configured to perform a method comprising:
    setting up a first and a second set of game coins (f) and (s) on a playing sides (A, D) of a playing surface of the board game, wherein the first set of game coins consist of a plurality of game coins marked with an indicia such I, II, III, IV, V, VII, and XI, wherein the second set of game coins consist of indicia Hash (#), wherein the playing side (A) is allotted with the first set of game coins and the playing side (D) is allotted with the second set of game coins;
    displaying the board game and the game coins on a display;

storing location information of the game coins (f) or (s) and rules information, wherein said rules information defines rules associated with how to determine a winner the board game; and allowing each player to alternatively move one of the game coins (f) or (s) assigned to the players over the playing surface with aim to eliminate the game coin marked with an indicia Hash (#) of an opponent to win the game when the game is not played in time restricted version or to eliminate the maximum game coins of the opponent and score more points than the opponent to win the game when the game is played in time restricted version, wherein the position of the players is interchanged in other half of the board game, wherein the player eliminating the indicia Hash (#) in less time or in less number of moves is declared winner of the board game, wherein each player moves the game coins (f) or (s) using an input device, wherein the input device comprises one of a keyboard, mouse, touchpad, microphone, touchscreen, trackball, and joystick, wherein the said board game is provided via a network to each of the players, wherein the board game comprises 100 abutting small squares arranged in 10 rows and 10 columns, the 10 rows extending from the attacking side to the defending side; wherein each abutting small square is marked with a number from 1 to 100 such that numbering arrangement of the abutting units in the first row on playing surface begins from 1, and sequentially goes till 10 and further continued in likewise manner for further rows by numbering the abutting units of next immediately adjacent rows with 10 digits higher numbers than the number mentioned on its adjacent abutting unit of previously numbered row, wherein the numbering arrangement of the abutting units in the last row on the playing surface begin with 91 to go sequentially and end with 100, wherein the board game 100 with color scheme represents the potential moves of the game coins (f, s), the numbering arrangement in the board game 100 with color scheme containing prime number is characterized by a color, wherein the color of the prime number is marked with red, wherein the numbering arrangement in the board game 100 with color scheme containing prime number may be of any color, wherein the numbering arrangement in the board game 100 with color scheme containing composite number is characterized by the color, the color of the composite number in the board game 100 with color scheme is marked with black, wherein, the numbering arrangement containing composite number may be of any color.

* * * * *